(12) United States Patent
Munday et al.

(10) Patent No.: US 9,144,129 B2
(45) Date of Patent: Sep. 22, 2015

(54) SWITCHABLE LUMINANCE LED LIGHT BULB

(71) Applicant: The Regents of the University of California, Oakland, CA (US)

(72) Inventors: David Munday, Santa Cruz, CA (US); Ryan Baker, Santa Cruz, CA (US); Julian Dahan, Santa Cruz, CA (US); Russell Petersen, Santa Cruz, CA (US); Craig Sloan, Santa Cruz, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 420 days.

(21) Appl. No.: 13/727,463

(22) Filed: Dec. 26, 2012

(65) Prior Publication Data

US 2013/0328493 A1 Dec. 12, 2013

Related U.S. Application Data

(63) Continuation of application No. 13/727,463, filed on Dec. 26, 2012.

(60) Provisional application No. 61/656,021, filed on Jun. 6, 2012, provisional application No. 61/667,982, filed on Jul. 4, 2012.

(51) Int. Cl.
*H05B 39/00* (2006.01)
*H05B 33/08* (2006.01)

(52) U.S. Cl.
CPC ........ *H05B 33/0839* (2013.01); *H05B 33/0803* (2013.01); *H05B 33/0815* (2013.01); *Y02B 20/346* (2013.01)

(58) Field of Classification Search
None
See application file for complete search history.

(56) References Cited

U.S. PATENT DOCUMENTS 8,853,950 B1 * 10/2014 Chang ............................ 315/127
2011/0133655 A1 * 6/2011 Recker et al. .................. 315/159

* cited by examiner

*Primary Examiner* — Lincoln Donovan
*Assistant Examiner* — Khareem E Almo
(74) *Attorney, Agent, or Firm* — Adam Warwick Bell; Matthew Rupert Kaser

(57) ABSTRACT

A switchable luminance LED light bulb, including embodiments that may be used with any common commercial fitting.

9 Claims, 6 Drawing Sheets

SWITCHABLE LUMINANCE LED LIGHT BULB

RELATIONSHIP TO OTHER APPLICATIONS

The present application claims priority to, and the benefit of the following applications that are entirely incorporated by reference to the fullest extent allowable by law: U.S. application Ser. No. 6,165,6021 filed 6 Jun. 2012 titled 'Switchable LED Light Bulb' and U.S. application Ser. No. 61,667,982 filed 4 Jul. 2012 titled 'Switchable Luminance LED Light Bulb'.

FIELD OF THE INVENTION

The presently disclosed subject matter is directed towards LED-type light bulbs. More particularly the presently disclosed subject matter relates to LED-type light bulbs that have switch controlled illumination intensities.

BACKGROUND OF THE INVENTION

While white light LED light bulbs have proven to be highly successful they have lacked one feature available in traditional incandescent light bulbs: the ability to provide multiple light outputs from one lamp. For example, 3-way Edison light bulbs are widely used to provide switchable light outputs. A 3-way Edison light bulb could use switched filaments to produce the light output of a 100 Watt, a 200 watt or a 300 watt light bulb. This feature has proven to be extremely popular and useful. In view of the foregoing, white light LED light bulbs having switch-selectable light outputs would be useful and commercially desirable. Even more useful would be white light LED light bulbs having switch-selectable light outputs and which mate with Edison, screw or bayonet fixtures.

BRIEF SUMMARY OF THE INVENTION

The present invention provides an LED bulb ('the device') with switch-selectable light outputs. The bulb may be mated with Edison, screw or bayonet types of lamp base fixtures. It is understood in the present disclosure that when an Edison fixture is mentioned as an example, the applicant is only using this as an example and implicitly includes all other types of fixtures such as screw or bayonet types.

The invention provides a low-power, transformerless, LED light bulb power supply capable of providing varying levels of electric current capable of powering variable numbers of LESd to produce proportionally varying levels of light. The invention allows any lamp using a standard Edison, screw bayonet type base to become an arbitrary-way lamp. This is similar to the common '3-way' lamp, but with the following key differences: (a) no specialty lamp is required, (b) no specialty 3-way bulb is required. The invention is different from a standard 'dimmable' bulb. It allows for a bulb to have as many discrete light output steps as desirable. The inventors' early prototype was capable of producing light equivalent to a 40W or 60W incandescent bulb using a switch to select between lighting levels. Commercially the invention allows the manufacturer to produce one design in mass quantity that will fit many needs. Due to the low power (below 10W) property of the LED light bulb, this invention is an appropriate replacement for almost any standard light bulb. When any standard bulb fails it could simply be replaced with a bulb of the invention and the user could set the desired lighting output at the time of installation. Therefore only one type of bulb need be purchased to replace a range of old standard bulbs.

The present invention encompasses a switchable luminance LED light bulb device comprising a rectifier to rectify AC to DC, wherein the DC current is fed into a switch, the switch having a single input pole and multiple output poles and a plurality of selectable positions, wherein the switch directs the current through one of a plurality of selectable resistors and/or capacitors corresponding to one of a plurality of different DC output currents, wherein the selected DC output current is fed into at least one of a plurality of light emitting diodes, wherein the selected DC output current corresponds to the light output of the light emitting diodes.

In certain embodiments the device will include a switch that can direct the current through a number of resistors, with no switchable selection of capacitors. In other embodiments, in order to increase the range of current and therefore light output, the device includes a switchable selection of capacitors. In this embodiment, an operator may select a combination of capacitors and resistors. The capacitor switch may be placed 'upstream' of the resistor switch, so that the current is first routed to one of a plurality of capacitors, each of which is may be associated with two or more resistors (for example 3, 4, 5, 6 or more resistors). Each capacitor is associated with two or more resistors so as to provide a graduated increase or decrease in current and therefore luminescence.

A current regulating device may be integrated into the device, and may be, in certain embodiments a step-down constant current controller. The device may comprise a current-regulating device and at least one transistor, wherein the current regulating device modulates the gate of the output transistor by reading the voltage, thereby regulating current delivered to LEDs.

In some embodiments the transistor may be, but is not necessarily, a field-effect transistor. In some embodiments it may be a MOSFET.

The present invention provides a white LED (light Emitting Diode) light bulb having a plurality of (two or more) white LEDs for emitting light. In some embodiments the LED light bulb includes an Edison-style screw cap for screwing into an Edison style base to receive input AC electrical power. However, the present invention is applicable to light bulbs with other types of caps for fitting other types of bases. A driver cover may be attached at one end to the Edison-style cap. The driver cover may include an opening for an actuator (any component that may be physically manipulated into different positions such as a switch, a slider, or a plurality of push-buttons) or a multiple-throw switch to pass through the driver cover, which enables a user to change the switched pole. In some embodiments the actuator need not be manually operable by the user, but may be operable remotely through a wired connection or a wireless connection employing widely known circuit technology.

A driver board retaining the switch may be at least partially located within the driver cover such that the switch passes through the opening. The driver board receives the input AC electrical power, rectifies that input AC electrical power into DC electrical power, and applies a constant DC current to the array of LEDs such that the applied current functionally depends on the selected pole position of the switch, and thus the light output functionally depends on the selected pole position.

In one embodiment the invention provides an LED light bulb, comprising one or more (in some embodiments two or more) LEDs for emitting a number of different light outputs of different intensity, for example either a first light output or a second light output; a cap for attaching to a base to receive input AC electrical power; a driver cover attached at one end to the cap, the driver cover having an opening through which a switch protrudes and is accessible; and a driver board having a switch having at least two positions selectable by an actuator that passes through the opening and is accessible to a user to change the switch position. The driver board further includes components capable of receiving input AC current, and rectifying the input AC current to produce a DC current of either a first magnitude or a second magnitude selected by the switch (pole) position.

In one embodiment the device comprises two strings of LEDs in parallel, and both strings are always powered. The current to each string is reduced in the lower lighting mode.

The DC current is applied to at least one LED wherein the LED(s) produce a first lumen output when said first DC current is applied or optionally, a second lumen output when said second DC current is applied; and wherein both first and second DC currents are sufficient to cause said at least one LED to emit light.

In certain embodiments the switch may be switchable to two or more positions, for example 1, 2, 3, 4, 5 or more switch positions, each associated with a different DC current, and therefore each associated with a different brightness (output value) of the one or more LEDs. In some embodiments all positions and all DC currents are sufficient to produce light from the LED. In other embodiments at least one position prevents the flow of current to the LED such that the LED produces no light (the "off" position).

Other embodiments include the LED light bulb wherein said cap is an Edison-style screw cap. Other embodiments use a non-Edison screw cap and may be suitable for attachment to any standard or non-standard electrical fixture. The LED may emit white light or a colored light. The light bulb may comprise a plurality of LEDs mounted on a light engine board. The switch may be a multiple pole slide switch or any other type of suitable switch including a push button, a rocker or a touch sensitive switch. The LED light bulb may include a light diffuser, and/or heat sink in thermal communication with said at least one LED. The driver board may include a switch having at least three selectable positions corresponding to three different DC currents, or in some embodiments a switch having between, for example, two and 10 selectable positions corresponding to between 2 and 10 different DC currents. Other numbers of alternative positions are possible and commonly 2 or 3 switch positions are provided. Alternatively at least 4, 5, 6 7, 10, 15, 20, 25, at least 50 or more switch positions may be provided. In some embodiments the LED light bulb may have a driver board comprising a switch having at least three selectable positions, one of which corresponds to an "off" position whereby no light is provided from one or more of the LEDs.

The present invention, though apparently simple in hindsight, is both novel and of great commercial value, and includes several technical features that are transformative in their effect, turning a simple LED light into a multiple-intensity light bulb, easily switchable between light intensities.

BRIEF DESCRIPTION OF THE DRAWINGS

The advantages and features of the present invention will become better understood with reference to the following detailed description and claims when taken in conjunction with the accompanying drawings in which:

DETAILED DESCRIPTION OF THE INVENTION

Figure 1:
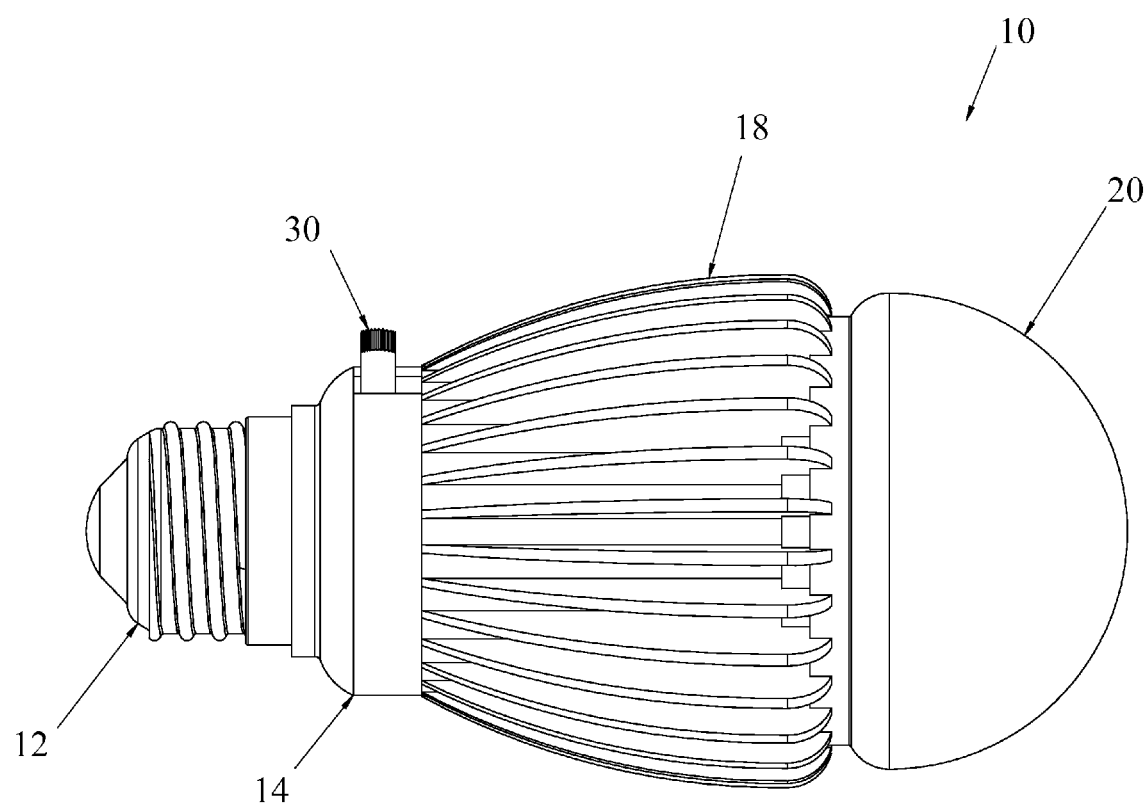
FIG. 1 is a pictorial diagram of an LED light bulb 10 that is in accord with the principles of the present invention.

In the figures like numbers refer to like elements throughout. Additionally, the terms "a" and "an" as used herein do not denote a limitation of quantity, but rather denote the presence of at least one of the referenced items. All publications mentioned herein are incorporated by reference for all purposes to the extent allowable by law.

The presently disclosed subject matter now will be described more fully hereinafter with reference to the accompanying drawings in which a specific embodiment is shown. However, it should be understood that this invention may take many different forms and thus it should not be construed as being limited to the specific embodiments set forth herein.

The invention encompasses a light bulb comprised of a plurality of LEDs having switch controlled illumination intensities.

In a broad embodiment, the invention encompasses a light bulb device comprising an AC electrical input, a plurality of (one or more) LEDs capable of emitting variable light intensities depending on the DC input current. The LEDs are in electrical communication with a driver board. The driver board is in communication with the AC electrical input. The driver board comprises a rectifier for rectifying AC current into DC current, and a switch having at least two selectable positions corresponding to a DC output of a first amperage or a second amperage corresponding to the selected switch position. The switch directs the current through one of two or more selectable resistors to provide the desired current, that is inversely proportional to resistance for a given voltage. The DC output amperage corresponds to the light output intensity of the LED(s).

The switch generally has one input pole (but could in other embodiments include a plurality of input poles), and generally has a plurality of output poles.

The switch ("the resistor switch") switches the current between a plurality of resistors.

The switch can take the form of a slide switch, a push-button switch, a rotary switch, a pull switch, a toggle switch, a knife switch, a touch switch, or any other multiple position switch suitable for selecting current through a resistor.

In other embodiments another switch (a 'capacitor switch') is provided, upstream of the resistor switch, that switches the current between alternative capacitors. The capacitor switch can have a single input, and multiple outputs corresponding to a plurality of capacitors, for example, 1, 2, 3, 4, 5, 6, or 7 or more capacitors. Each capacitor will be associated with, and will conduct current to, a resistor switch, which will switch the current between a plurality of resistors, as previously described. In this way the range of DC current, and therefore luminescence, in increased.

In one embodiment, two switch positions correspond to a first amperage and a second amperage wherein both amperages are sufficient to cause at least one (or all) of the LEDs to emit light.

In another embodiment the switch comprises at least three selectable switch positions at least two of which correspond to an amperage sufficient to cause at least one LEDs to emit light, and wherein at least one selectable switch position corresponds to an "off" position wherein no said LEDs emit an appreciable intensity of light visible to the human eye in normal daylight conditions.

In certain embodiments the device of the invention includes a current regulating device. This current regulating device may, for example, be a chip (in the exemplary embodiment the inventors used an "lm 3444") that pulse width modulates (PWM) the gate of the output MOSFET (metal-oxide-semiconductor field-effect transistor). The IC measures the voltage through the ISNS pin and regulates the current accordingly.

Although a MOSFET is used in the example, any transistor providing the same functions may be used in other embodiments (e.g., an FET, a BJT or even more crudely, anything that can produce a constant DC voltage, may be employed).

In one embodiment a second transistor is provided that in conjunction with the Zener diode provides constant voltage.

An exemplary embodiment provides a switchable luminance LED light bulb device comprising: an AC input component in functional communication with a driver board, the driver board comprising a rectifier, wherein the DC current is fed into a switch, the switch having a single input pole and multiple output poles and a plurality of selectable positions, wherein the switch directs the current through one of a plurality of selectable resistors corresponding to one of a plurality of different DC output currents, wherein the selected DC output current is fed into at least one of a plurality of light emitting diodes, wherein the selected DC output current corresponds to the light output of the light emitting diodes.

The switch may be of any suitable type such as a slide switch, a push-button switch, a rotary switch, a pull switch, a toggle switch, a knife switch or a touch switch.

In some embodiments any selectable DC output current is sufficient to cause at least one of a plurality of light emitting diodes to emit light. In other embodiments at least one selectable DC output current corresponds to an "off" position and is insufficient to cause at least one of a plurality of light emitting diodes to emit light.

The device may include a current-regulating device functionally associated with the driver board to regulate current to the LEDs. The current-regulating device may be a current regulating integrated circuit.

The device may include a current-regulating device and at least one transistor, wherein the current regulating device modulates the gate of the output transistor (for example, but not necessarily, a MOSFET or other field-effect transistor) by measuring the voltage, thereby regulating current.

In some embodiments the device comprises at least two transistors wherein one transistor is in communication with the Zener diode so as to provide constant voltage to the current regulating device.

Other components in various embodiments may include a noise suppression capacitor downstream of the AC input, and a bridge rectifier downstream of the AC input.

Other embodiments may include voltage regulation by use of a Zener diode. The regulated voltage can be applied to an N-channel power MOSFET and the drain of the MOSFET may be connected to a node while the source connects to the anode of a Schottky rectifier and wherein the cathode of the Schottky rectifier connects to a second, fixed voltage node connected to a filter capacitor, wherein the second node also connects to the input of a current regulator and to the common pole of a switch having a single input pole and a plurality of output poles corresponding to a plurality of resistors, wherein the current regulator is a constant current controller that provides a regulated current for illuminating a light emitting diode.

Alternative commercial embodiments include a driver board is mechanically attached to a cap adapted to be releasably fitted to an AC electrical output socket. The cap may be of any suitable type such as an Edison-style screw cap or bayonet-mount cap or any other type of cap.

In some embodiments the switch includes an actuator that is manually operable, i.e. an external switch is provided by which means an operator can switch between intensities of illumination. The switch may alternatively be operable remotely, either by wire or wireless means of control.

In an exemplary embodiment the device includes an AC input component that routes the input voltage across a noise suppression capacitor to a bridge rectifier, wherein one output of the bridge rectifier goes to ground while the positive output goes to a node wherein the voltage at the node is applied to a Zener diode via a resistor to produce a regulated voltage on the gate of an N-channel power MOSFET, wherein the drain of the MOSFET connects to the node while the source connects to the anode of a Schottky rectifier, wherein the cathode of the Schottky rectifier to a second, fixed voltage node connected to a filter capacitor, wherein the second also connects to the input of a current regulator and a switch having a single input pole and a plurality of output poles corresponding to a plurality of resistors, wherein the current regulator is a constant current controller that provides a regulated current for illuminating a light emitting diode.

Figure 5:
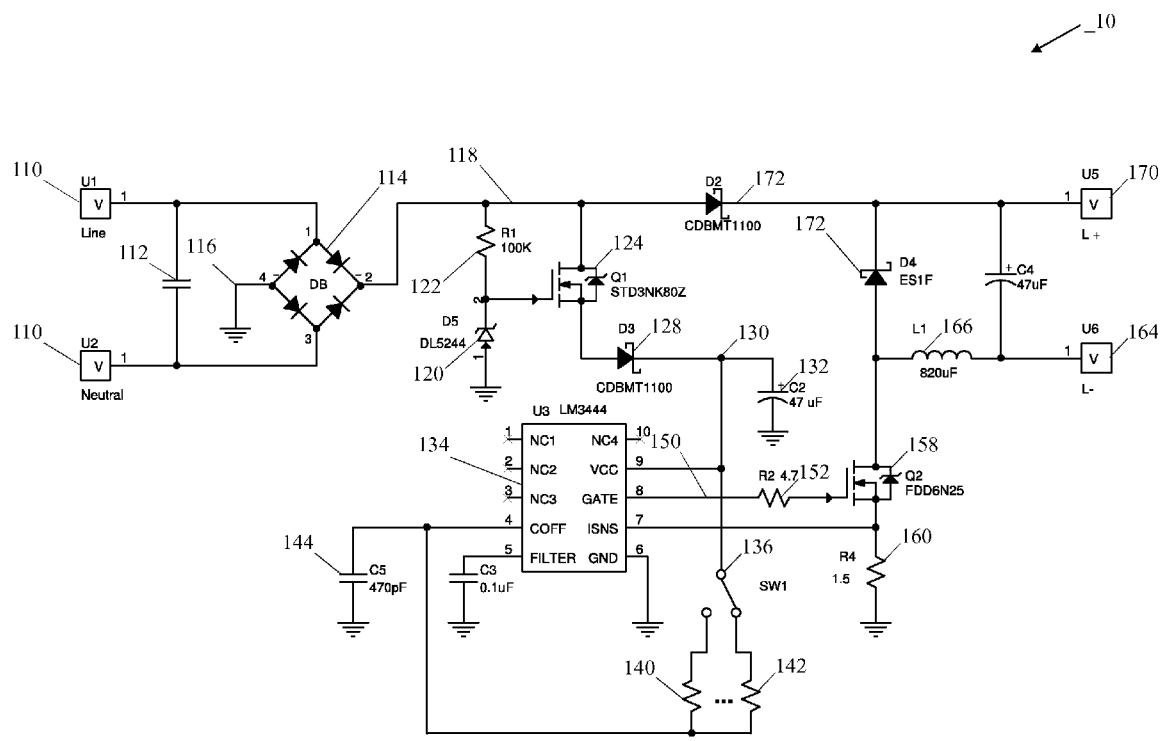
FIG. 5 is a schematic diagram of the LED light bulb driver circuit 10 shown in FIGS. 1 and 2. Note in FIG. 5, the switch referred to in parts of the text as part '32' is actually labeled 'SW1'. When reading '32' please substitute 'SW1'.

FIG. 5 presents a schematic diagram of the electronics on the LED driver board 16. The AC line voltage 100 is applied to input terminals 110 which route the line voltage 100 across a noise suppression capacitor 112 and across the input terminals of a bridge rectifier 114. One output of the bridge rectifier 114 goes to ground 116 while the positive output goes to a node 118.

The voltage at the node 118 is applied to a Zener diode 120 via a resistor 122. This produces a regulated voltage on the gate of an N-channel power MOSFET 124 transistor. The drain of the MOSFET 124 connects to the node 18 while the source connects to the anode of a Schottky rectifier 128. The cathode of the Schottky rectifier 128 goes to a node 130 which connects to a filter capacitor 132. The node 130 is therefore a fixed voltage node.

Note that when a "Schottky rectifier" is specified in this disclosure, any other rectifier performing the same function may be used, particularly any semiconductor diode with a low forward voltage drop and a very fast switching action.

The node 130 also connects to the Vcc input of an LM3444 current regulator IC 134 and to the common terminal 136 of the switch 32, which may be a single pole double throw (SPDT) switch. Note in FIG. 5, the switch referred to in parts of the text as part '32' is actually labeled 'SW1'. When reading '32' please substitute 'SW1'. Thus the single input pole of the switch 32 controls which of its two output poles 191 and 193 is selected. The current regulator IC 134 is a constant current controller that regulates current for powering one or more LEDs. The actual regulated current is controlled by the pole position of the switch 32. The voltage on the node 130 is selectively switched by the switch 32 between resistors 140 and 142 via poles 191, 193, respectively. While the switch 32 in the example is only a double throw switch, in other embodiments more switching poles can be used with more capacitors and/or resistors to achieve additional switch selectable lumens.

Having two (or greater) switch selectable DC current magnitudes reflects a beneficial design choice characterized by both low cost and simple user operation. However, another useful embodiment uses a three position illumination control switch, two positions of which select DC current magnitudes while the third position turns the LED light bulb 10 OFF. Another useful embodiment also uses a three position illumination control switch, but all three positions select different DC current magnitudes, thus allowing the illumination control switch to select three different illuminations. Other useful embodiments have 4 to 10 and possibly even more illumination control switch positions that select different DC current magnitudes (including OFF) and thus the illumination control switch can select four to 10 or more different illuminations. All of those embodiments as well as others that fall within the broad scope of the appended claims are encompassed by this invention.

Figure 2:
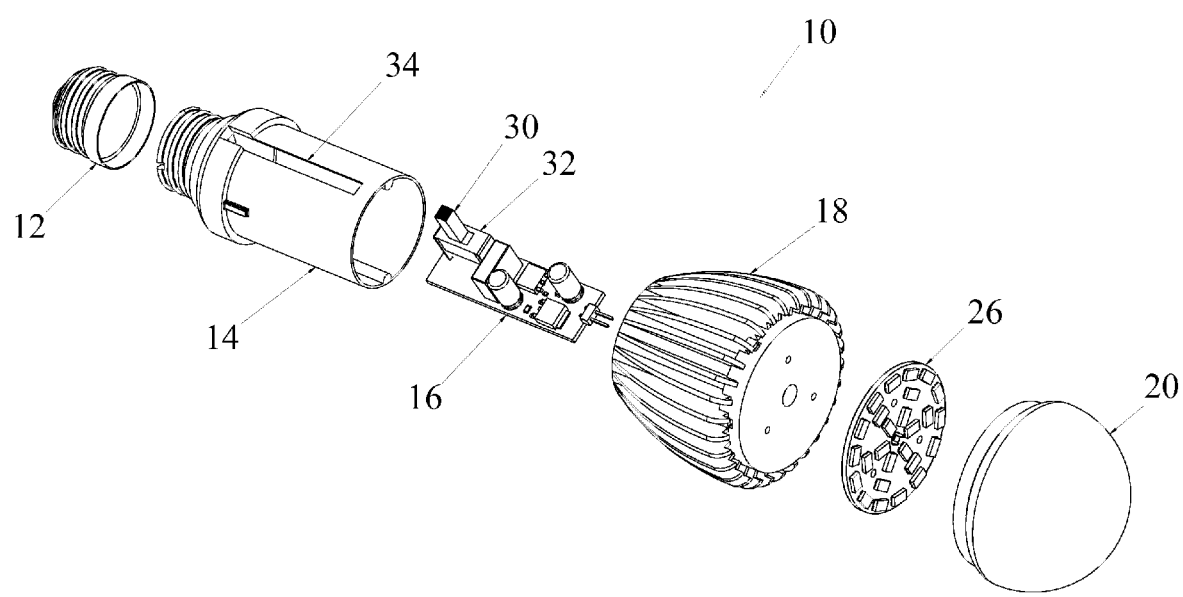
FIG. 2 is an exploded view of the LED light bulb 10 shown in FIG. 1.

The principles of the present invention are illustrated in the exemplary embodiment shown in FIGS. 1 through 6. Referring now to FIGS. 1 and 2 the present invention relates to an LED light bulb 10. The LED light bulb 10 includes an Edison-type screw cap 12 that mates with prior art Edison-type bases. In fact, the LED light bulb 10 is configured to be a direct replacement for prior art Edison light bulbs. Thus the LED light bulb 10 is directly useable in millions of existing applications.

Still referring to FIGS. 1 and 2, the Edison screw cap 12 connects to a driver case 14 which houses an LED driver board 16. The driver case 14 connects at its other end to a heat sink 18 such that the devices on the LED driver board 16 are in thermal communication with the heat sink 18. In certain embodiments the light engine is in thermal communication with the heat sink, and in other embodiments the driver board may not be in thermal communication with the heat sink. Attached to the other end of the heat sink 18 is a light diffuser 20. The light diffuser 20 covers a light engine 26 board that is in thermal communication with the heat sink 18. An actuator arm 30 of a multiple position switch 32 on the LED driver board 16 pass through a slot 34 that extends along the driver case 14. Note in FIG. 5, the switch referred to in parts of the text as part '32' is actually labeled 'SW1'. When reading '32' please substitute 'SW1'.

Figure 3:
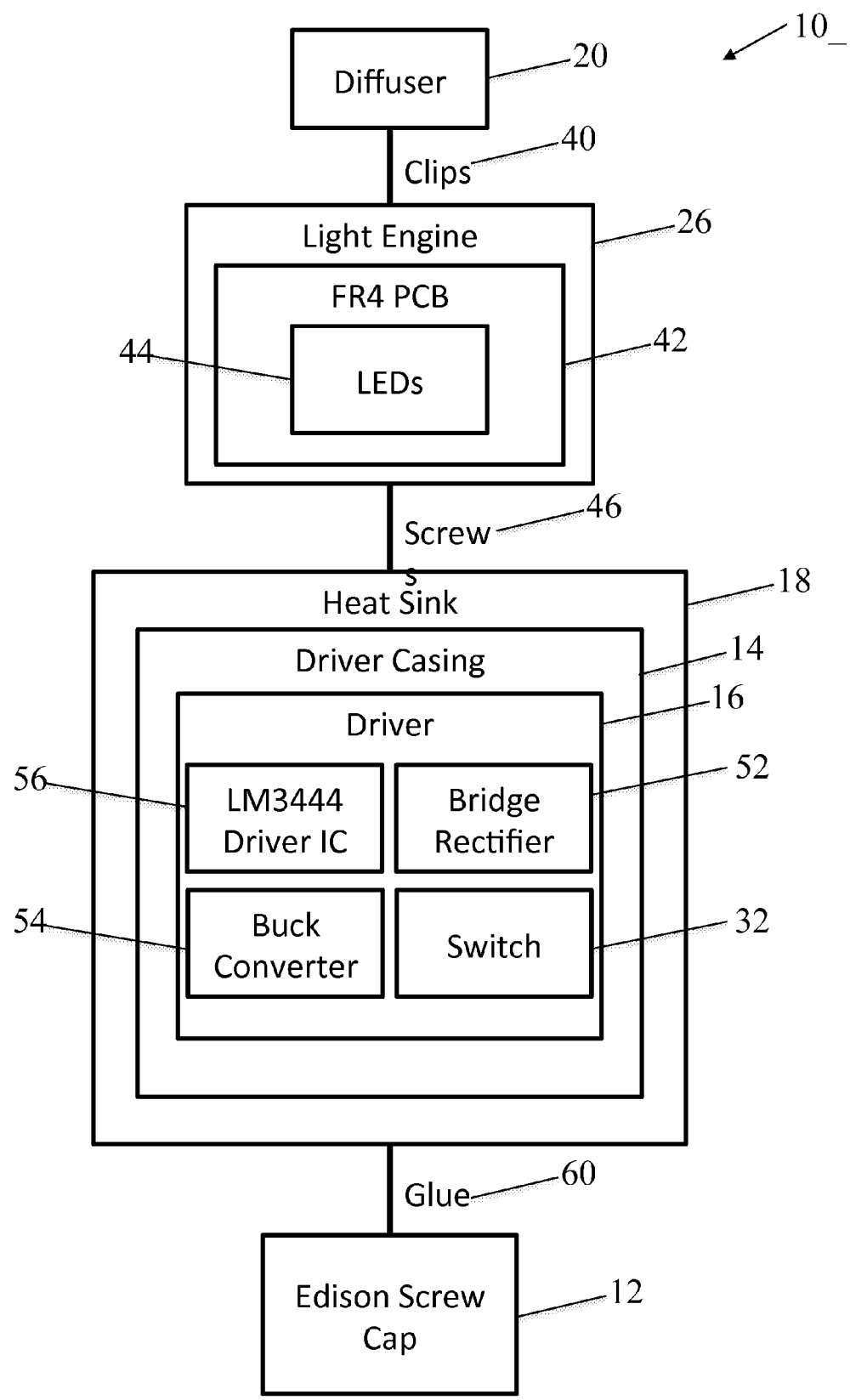
FIG. 3 is a block diagram of the mechanical system of the LED light bulb 10 shown in FIGS. 1 and 2.

FIG. 3 presents another mechanical view of the LED light bulb 10. FIG. 3 shows the diffuser 20 as being attached to the light engine 26 by clips 40. Note that clips are given as an example, but any suitable fixing device may be used such as screws, solder etc. Inside the light engine 40 is a printed circuit board PCB 42 that holds an array of white-LEDs 44. The white-LEDs 44 are arranged to emit white light into the diffuser 20. Also as shown the light engine 26 is attached to the heat sink 18 by screws 46. Note that screws are given as an example, but any suitable fixing device may be used such as clips, solder etc.

The heat sink 18 covers most of the driver casing 14. Located inside the driver casing 14 is the LED driver board 16. As shown the LED driver board 16 includes a bridge rectifier 52, a buck converter 54, the multiple position switch 32 and a driver IC 56, while the driver casing 14 is attached to the Edison screw cap 12 by glue 60. Note that any form of fixing agent may be used.

The white-LEDs 44 operate on direct current (DC) electrical current while the standard household current power is AC. Thus rectification is required. Furthermore, the LEDs 44 operate at relatively low voltages and for proper operation they receive regulated DC currents supplied at appropriate low voltages. The higher the DC current the more light (lumens) and heat the white-LEDs 44 produce. The LED light bulb 10 provides for two or more switch 32 selectable DC currents that are selectively applied to the white-LEDs 44 to emit light as well as for thermal heat sinks and cooling. While other configurations might include a switch that completely turns off the LEDs, in the LED light bulb 10 both switch 32 positions cause light to be emitted from the white-LEDs 44. Both the electrical operation and thermal paths are important. In the present example the LED light bulb 10 provides for two switch 32 selectable DC currents, however in other embodiments, 3, 4, 5 or more selectable DC currents may be provided by the switch.

Figure 4:
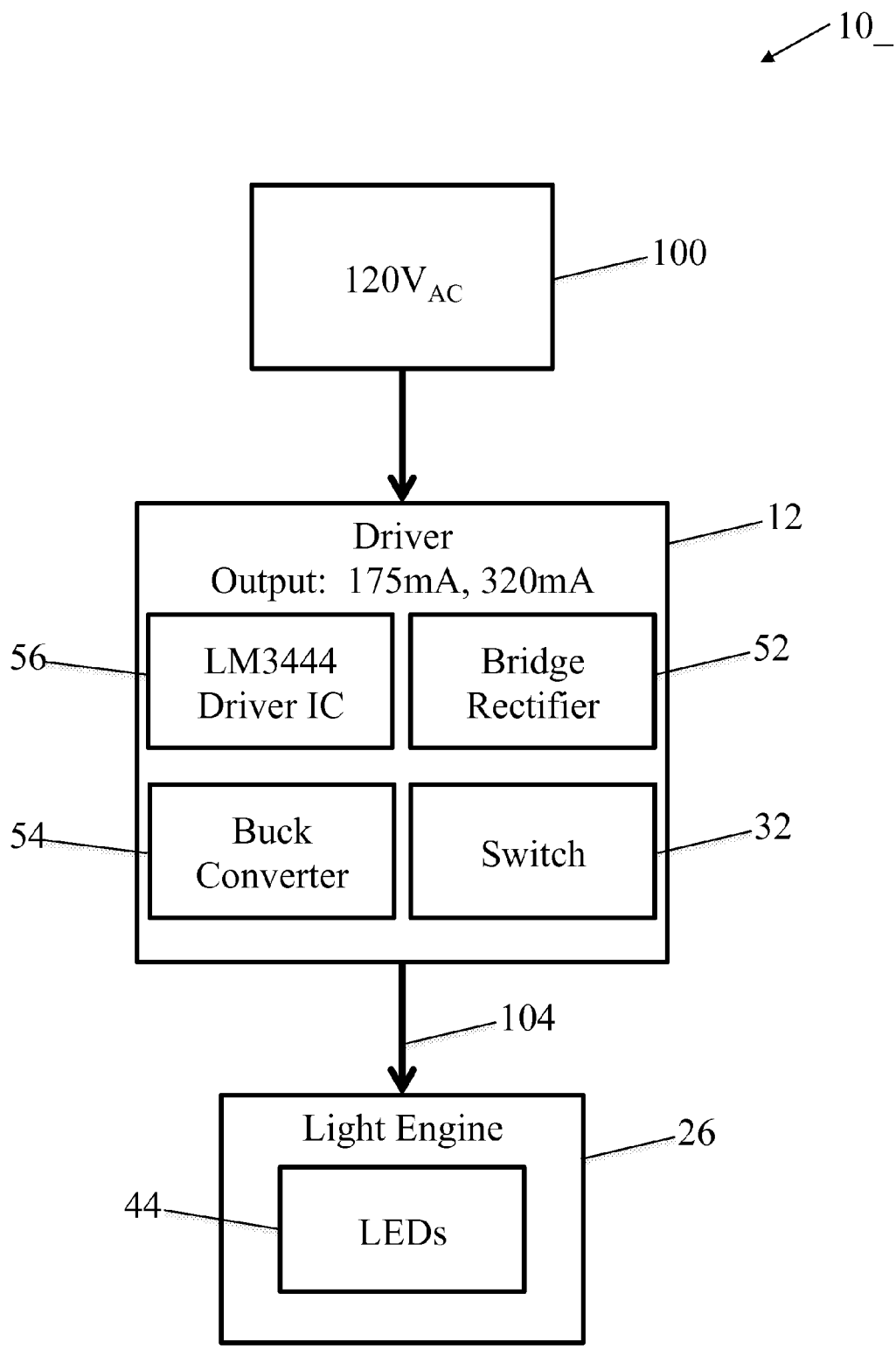
FIG. 4 is a block diagram of the electrical system of the LED light bulb 10 shown in FIGS. 1 and 2.

The overall electrical path of the LED light bulb 10 is shown in FIG. 4. AC voltage 100 is input to the LED light bulb 10 and is directed to the LED driver board 16. As previously described the LED driver board 16 includes the driver IC 56, the bridge rectifier 52, the buck converter 54, and the switch 32. The switch 32 has multiple poles that control the DC current 104 that is applied to the light engine 26, its white-LEDs 44, and its printed circuit board PCB 42. The printed circuit board 42 retains the white-LEDs 44 while the amount of the applied DC current depends on which position of the switch is selected. Since the switch 32 controls the amount of DC current it also controls the light output of the white-LEDs 44.

The efficiency of white light LED devices is increasing over time. Thus, the number of individual white-LEDs 44 required in a particular application will depend both on the amount of light output desired as well as the efficiency of the individual LEDs 44. However, it should be understood that the LEDs 44 do not uniformly emit light, and that their lumen (light) outputs are directed into the diffuser 20 which diffuses the light in a more uniform way.

FIG. 5 presents a schematic diagram of the electronics on the LED driver board 16. The AC line voltage 100 is applied to input terminals 110 which route the line voltage 100 across a noise suppression capacitor 112 and across the input terminals of a bridge rectifier 114. One output of the bridge rectifier 114 goes to ground 116 while the positive output goes to a node 118.

The voltage at the node 118 is applied to a Zener diode 120 via a resistor 122. This produces a regulated voltage on the gate of an N-channel power MOSFET 124 transistor. The drain of the MOSFET 124 connects to the node 118 while the source connects to the anode of a Schottky rectifier 128. The cathode of the Schottky rectifier 128 goes to a node 130 which connects to a filter capacitor 132. The node 130 is therefore a fixed voltage node.

The node 130 also connects to the Vcc input of an LM3444 current regulator IC 134 and to the common terminal of the switch 32. Thus the single input pole of the switch 32 controls which of its two output poles is selected. The current regulator IC 134 is a constant current controller that power the high power LEDs. The actual regulated current is controlled by the pole position of the switch 32. The voltage on the node 130 is selectively switched by the switch 32 between resistors 140 and 142 via poles 191, 193, respectively. While the switch 32 is only a double throw switch, in other embodiments more switching poles can be used with more capacitors and/or resistors to achieve additional switch selectable lumens.

The outputs of the resistors 140 and 142 (and any other lumen control resistor that is used) are applied to the C-off input pin (pin 4 in the figure) input of the current regulator IC 134 and to a high frequency filter capacitor 144. The current regulator IC 134 regulates the voltage on a gate output 150 which is applied via a resistor 152 to the gate of an N-Channel MOSFET 158. The source of the N-Channel MOSFET 158 connects to ground 116 via a current sense resistor 160 and to a current sense input of the current regulator IC 134. The drain of the N-Channel MOSFET 158 connects to an Driver output terminal 164 via a transient reducing inductor 166.

The LEDs 44 are series connected with the cathode end connecting to an Driver output terminal 164 and the anode end connecting to an driver output terminal 170. A filtering capacitor 172 also connects between the Driver output terminal 164 and the Driver output terminal 170. Connected between the Driver output terminal 170 and the drain of the N-Channel MOSFET 158 is a fast recovery diode having its cathode end connected to the Driver output terminal 170. Connected between the Driver output terminal 170 and the node 118 is a Schottky diode 172 having its cathode connected to the Driver output terminal 170.

The current-regulating device regulates the current applied to the LEDs. The current-regulating device in the example is specified as regulating about 175 mA to about 320 mA of DC current. In some alternative embodiments the device may draw between 10 mA and 100,000 mA, for example between 100 and 4000 mA, or between 100 and 750 mA, or between 500 and 1000 mA, or between 500 and 5000 mA. The LED light bulb may be configured to have similar light outputs to incandescent bulb of 1W, 5W, 10W, 25W, 50W, 75W, 100W, 200W, 500W, 1000W, 3000W and 10,000W or even more.

In operation, the bridge rectifier 114 places a rectified voltage on the node 118. The current through the LEDs 44 passes through the N-Channel MOSFET 158, with that current being regulated by the voltage applied by the current regulator IC 134 to the gate of the N-Channel MOSFET 158. That current is sensed by the current regulator IC 134 by its monitoring of the voltage drop across the sensing resistor 160. The desired current depends on the current through either the resistor 140 or 142, depending on which is selected by the pole position of the switch 32. Once the resistor 140, 142 is selected the current regulator IC 134 regulates the current through the LEDs 44.

The LEDs 44 in the LED light bulb 10 are connected as two series-parallel strands of LEDs. The leading cathode input end of each strand is connected to the Driver output terminal 164 and the trailing anode output end of each strand is connected to the Driver output terminal 170.

Figure 6:
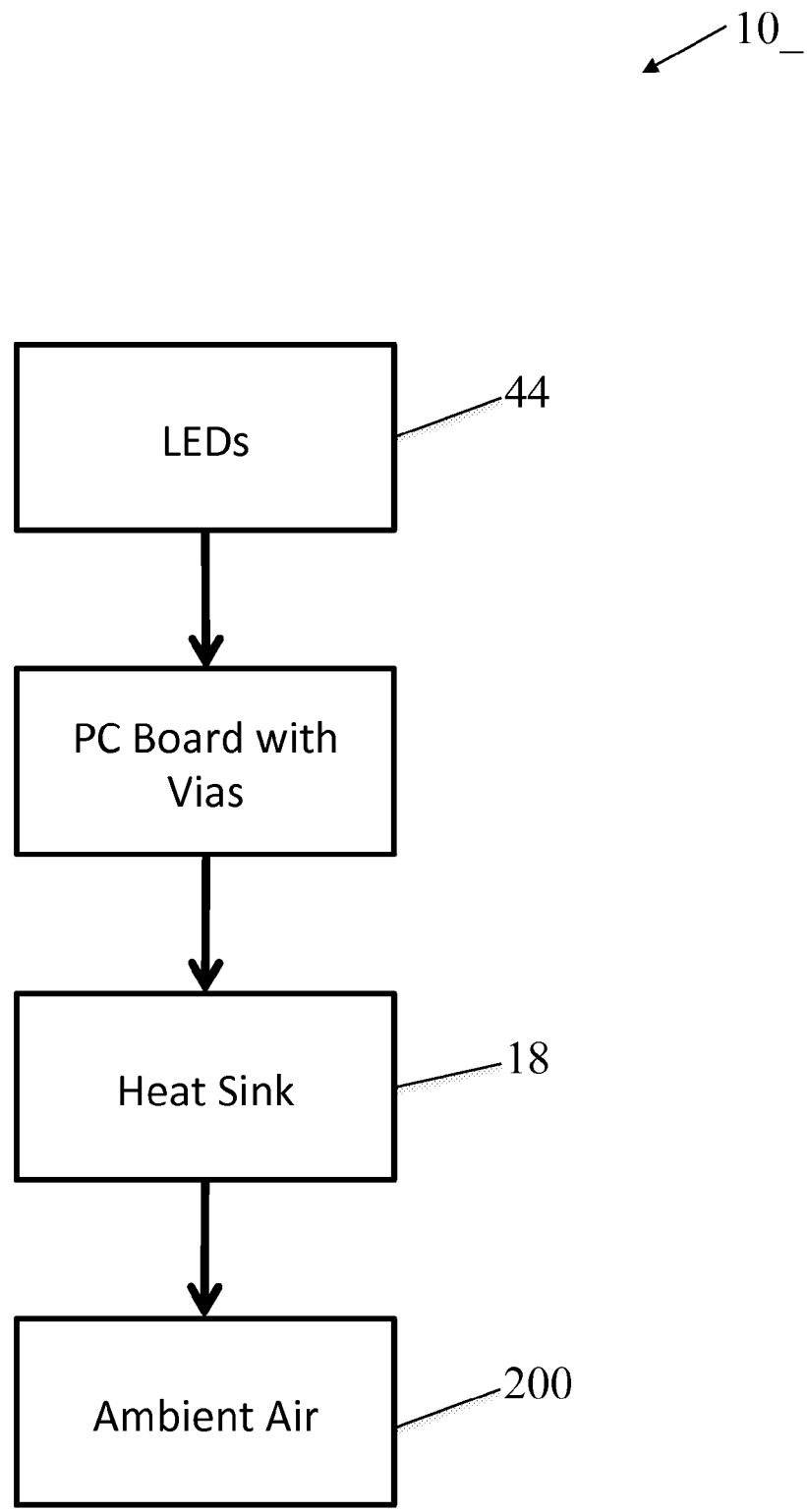
FIG. 6 is a block diagram of the thermal path of the LED light bulb 10 shown in FIGS. 1 and 2.

Referring now to FIG. 6, the LEDs 44 generates heat. That heat is transferred to the PCB 42, which is composed of FR4 material with copper planes on top and bottom connected by electrically-isolated, thermally-conductive through-hole vias. From the PCB, heat is conducted to the heat sink 18 which radiates heat to the ambient air 200. In other embodiments, metal-core PCBs may be used to allow for heat transference.

Therefore, it is to be understood that while the figures and the above description illustrate the present invention, they are exemplary only. They are not intended to be exhaustive or to limit the invention to the precise forms disclosed, and obviously many modifications and variations are possible in light of the above teaching. Others who are skilled in the applicable arts will recognize numerous modifications and adaptations of the illustrated embodiments that remain within the principles of the present invention. Therefore, the present invention is to be limited only by the appended claims.

The invention claimed is:

1. A switchable luminance LED light bulb device comprising: an AC input component in functional communication with a driver board, the driver board comprising a rectifier, wherein the DC current is fed into a switch, the switch having a single input pole and multiple output poles and a plurality of selectable positions, wherein the switch directs the current through one of a plurality of selectable capacitors and/or resistors corresponding to one of a plurality of different DC output currents, wherein the selected DC output current is fed into at least one of a plurality of light emitting diodes, wherein the selected DC output current corresponds to the light output of the light emitting diodes, the device further comprising a switch having a plurality of output poles each connected to a different capacitor, wherein the current from the capacitor is subsequently conducted to a switch having a plurality of output poles each connected to a different resistor, wherein the combination of capacitor and resistor selected corresponds to a selected DC output current that corresponds to the light output of the light emitting diodes.

2. A switchable luminance LED light bulb device comprising: an AC input component in functional communication with a driver board, the driver board comprising a rectifier, wherein the DC current is fed into a switch, the switch having a single input pole and multiple output poles and a plurality of selectable positions, wherein the switch directs the current through one of a plurality of selectable capacitors and/or resistors corresponding to one of a plurality of different DC output currents, wherein the selected DC output current is fed into at least one of a plurality of light emitting diodes, wherein the selected DC output current corresponds to the light output of the light emitting diodes, further comprising a current regulating device functionally associated with the driver board, and at least one transistor, wherein the current regulating device modulates the gate of the output transistor by measuring the voltage, thereby regulating current.

3. The device of claim 2 wherein the transistor is a MOSFET.

4. A switchable luminance LED light bulb device comprising: an AC input component in functional communication with a driver board, the driver board comprising a rectifier, wherein the DC current is fed into a switch, the switch having a single input pole and multiple output poles and a plurality of selectable positions, wherein the switch directs the current through one of a plurality of selectable capacitors and/or resistors corresponding to one of a plurality of different DC output currents, wherein the selected DC output current is fed into at least one of a plurality of light emitting diodes, wherein the selected DC output current corresponds to the light output of the light emitting diodes, the device comprising at least two transistors wherein one transistor is in communication with the Zener diode so as to provide constant voltage to the current regulating device.

5. A switchable luminance LED light bulb device comprising: an AC input component in functional communication with a driver board, the driver board comprising a rectifier, wherein the DC current is fed into a switch, the switch having a single input pole and multiple output poles and a plurality of selectable positions, wherein the switch directs the current through one of a plurality of selectable capacitors and/or resistors corresponding to one of a plurality of different DC output currents, wherein the selected DC output current is fed into at least one of a plurality of light emitting diodes, wherein the selected DC output current corresponds to the light output of the light emitting diodes, further comprising a bridge rectifier downstream of the AC input.

6. The device of claim 5 wherein voltage is regulated by use of a Zener diode.

7. The device of claim 6 wherein the regulated voltage is applied to a transistor and the drain of the transistor connects to a node while the source connects to the anode of a rectifier and wherein the cathode of the rectifier connects to a second, fixed voltage node connected to a filter capacitor, wherein the second node also connects to the input of a current regulator and to the common pole of a switch having a single input pole and a plurality of output poles corresponding to a plurality of capacitors and/or resistors, wherein the current regulator is a constant current controller that provides a regulated current for illuminating a light emitting diode.

8. A switchable luminance LED light bulb device comprising: an AC input component in functional communication with a driver board, the driver board comprising a rectifier, wherein the DC current is fed into a switch, the switch having a single input pole and multiple output poles and a plurality of selectable positions, wherein the switch directs the current through one of a plurality of selectable capacitors and/or resistors corresponding to one of a plurality of different DC output currents, wherein the selected DC output current is fed into at least one of a plurality of light emitting diodes, wherein the selected DC output current corresponds to the light output of the light emitting diodes, wherein the driver board is mechanically attached to a cap adapted to be releasably fitted to an AC electrical output socket, and wherein said cap is bayonet-mount cap.

9. A switchable luminance LED light bulb device comprising: an AC input component in functional communication with a driver board, the driver board comprising a rectifier, wherein the DC current is fed into a switch, the switch having a single input pole and multiple output poles and a plurality of selectable positions, wherein the switch directs the current through one of a plurality of selectable capacitors and/or resistors corresponding to one of a plurality of different DC output currents, wherein the selected DC output current is fed into at least one of a plurality of light emitting diodes, wherein the selected DC output current corresponds to the light output of the light emitting diodes, wherein the AC input component routes the input voltage across a noise suppression capacitor to a bridge rectifier, wherein one output of the bridge rectifier goes to ground while the positive output goes to a node wherein the voltage at the node is applied to a Zener diode via a resistor to produce a regulated voltage on the gate of an N-channel power MOSFET, wherein the drain of the MOSFET connects to the node while the source connects to the anode of a Schottky rectifier, wherein the cathode of the Schottky rectifier to a second, fixed voltage node connected to a filter capacitor, wherein the second also connects to the input of a current regulator and a switch having a single input pole and a plurality of output poles corresponding to a plurality of resistors, wherein the current regulator is a constant current controller that provides a regulated current for powering a light emitting diode.

* * * * *